May 30, 1944.  H. SHELLMER ET AL  2,350,070
MACHINE FOR MAKING FLEXIBLE TUBES
Filed Feb. 11, 1942     4 Sheets-Sheet 2
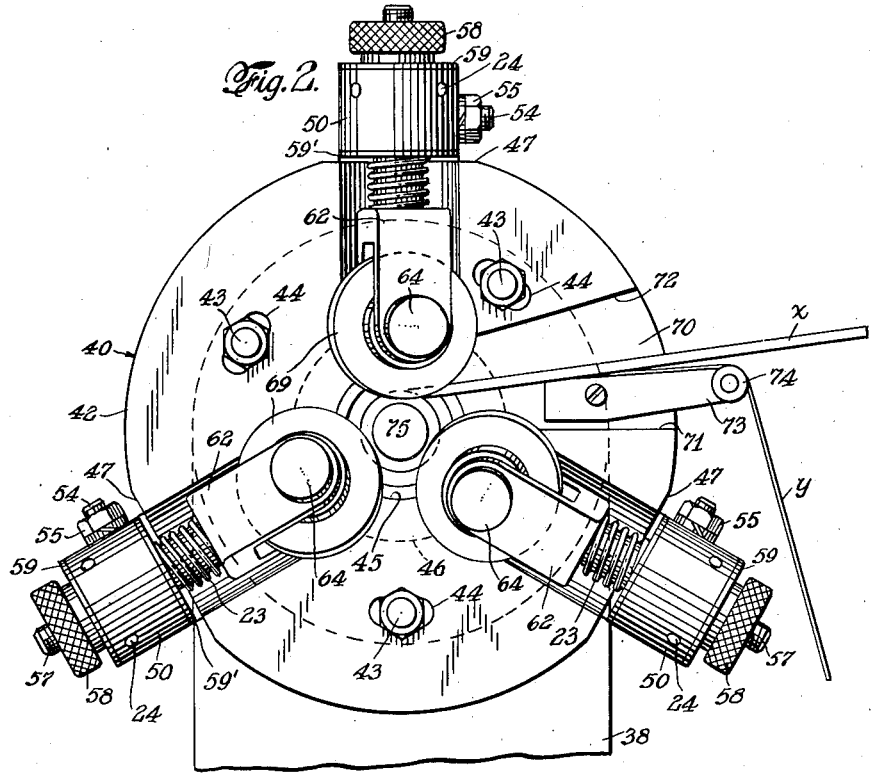
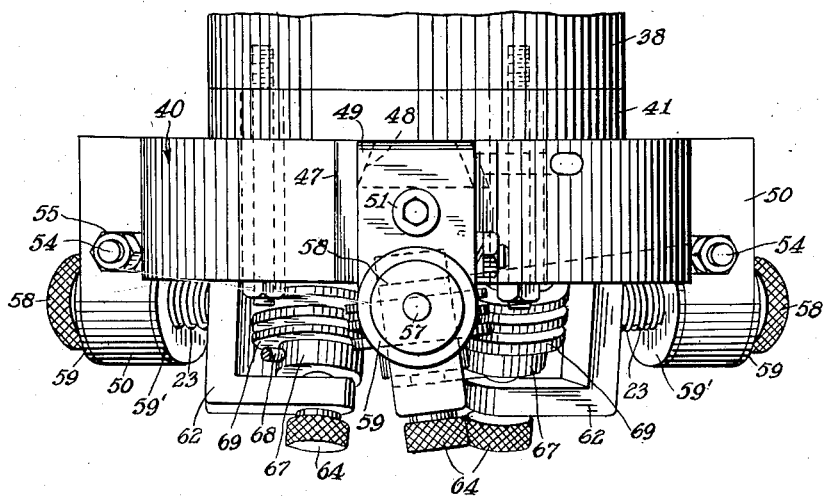
INVENTORS
EDWARD J. RENNIE
HERMAN SHELLMER
BY Cousins & Cousins
ATTORNEYS.

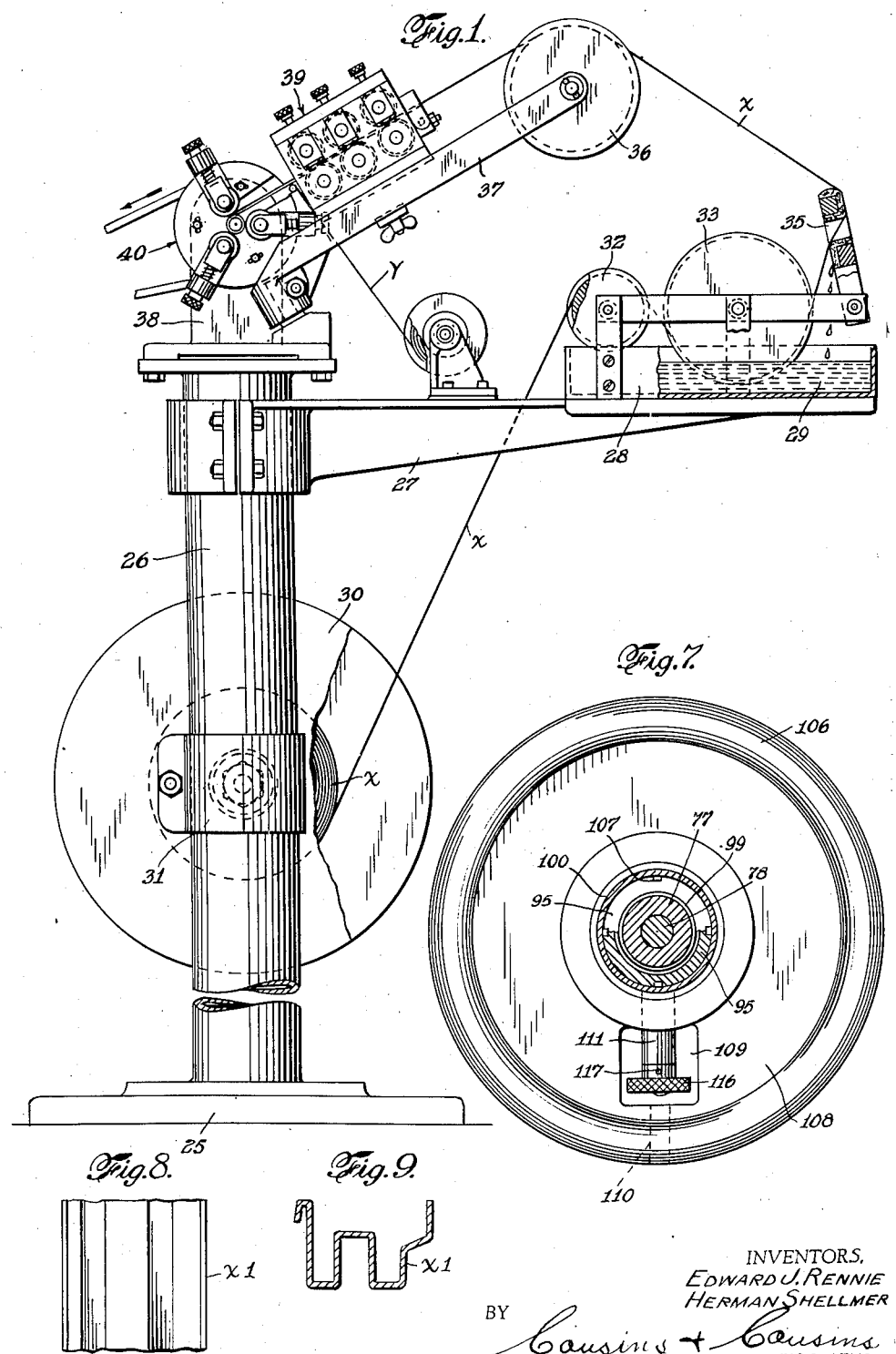

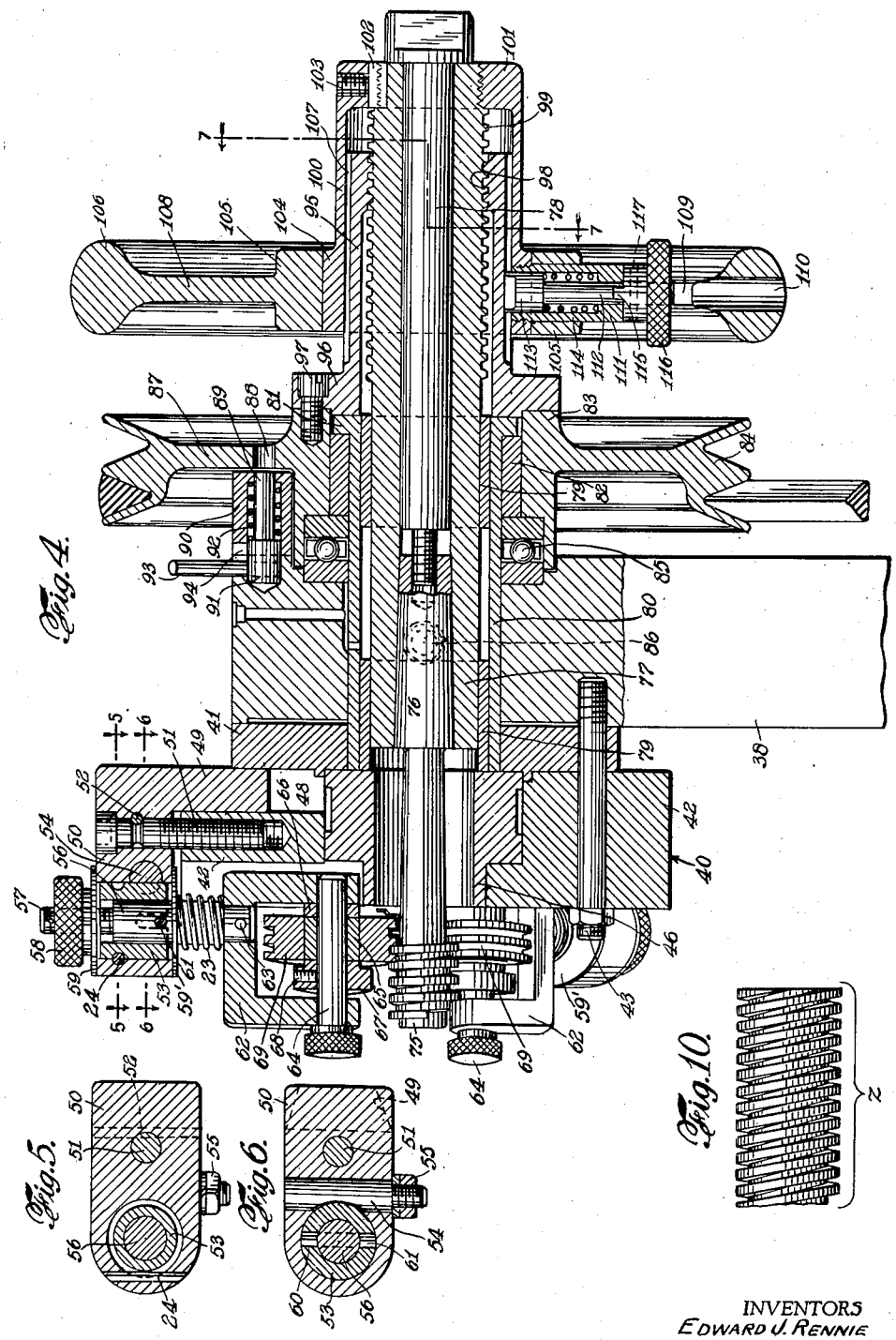

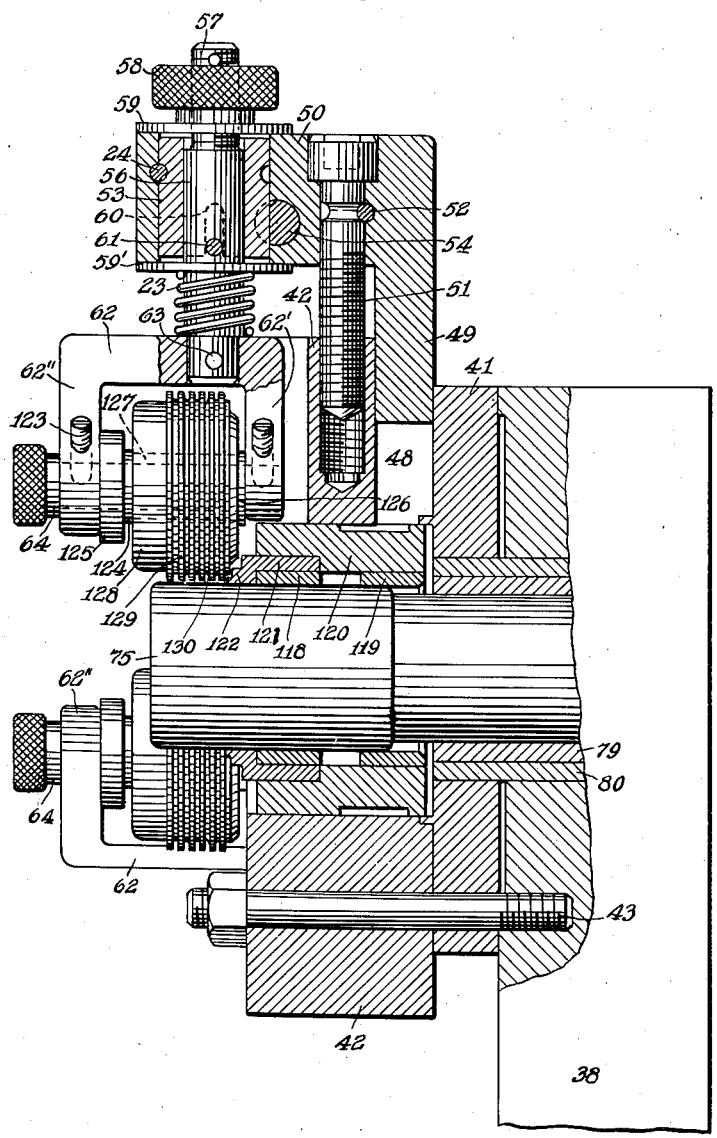

Patented May 30, 1944

2,350,070

UNITED STATES PATENT OFFICE 2,350,070

MACHINE FOR MAKING FLEXIBLE TUBES

Herman Shellmer, Newark, and Edward J. Rennie, Denville, N. J., assignors to Breeze Corporations, Inc., Newark, N. J., a corporation of New Jersey Application February 11, 1942, Serial No. 430,382

8 Claims. (Cl. 113—35)

This invention relates to apparatus for manufacturing flexible metallic tubing, more specifically to a machine having an adjustable die head capable of producing tubes of different diameters, and is similar in certain respects to an application filed March 14, 1941, Serial No. 383,298, now Patent No. 2,305,587, issued December 22, 1942.

Hitherto it has been common to use a die head designed for each size of tubing required, changing the head whenever another size was to be made, such changes involving loss of time and expenditure for labor, while the actual production in feet per minute is excessively slow.

It is, therefore, an object of this invention to provide a die head capable of adjustment so that tubing of different diameters may be produced by the same head with a minimum of change of parts, the necessary changes being quickly and readily made.

A further feature is in the provision of means, combined in a single die head, for the accurate and economic production of flexible metallic tubing in different diameters, at a rate of speed many times that previously obtainable by known mechanism.

Another purpose is to produce a series of interchangeable die heads, each suited to the production of a range of tube sizes within the limit of their capacity.

These and other advantageous objects are accomplished by the novel and practical construction and combination of parts hereinafter described, and illustrated in the accompanying drawings, constituting a graphical component of this disclosure, and in which—

Figure 1 is a side elevational view of a complete embodiment of the tube-making machine.

Figure 2 is an enlarged front view of the enseaming die head used in the machine.

Figure 3 is a top plan view of the parts shown in Figure 2.

Figure 4 is a longitudinal sectional view taken on the center line of the head, drawn to an enlarged scale.

Figure 5 is a transverse sectional view, taken on line 5—5 of Figure 4.

Figure 6 is a similar section view taken on line 6—6 of Figure 4.

Figure 7 is a transverse sectional view taken on line 7—7 of Figure 4, drawn to a reduced scale.

Figure 8 is a plan view of a fragment of the undulated or crenulated strip prior to entering the seaming head.

Figure 9 is a cross-sectional view thereof.

Figure 10 is a view of the seamed tube.

Figure 11 is a partial elevational, partial transverse sectional view similar to Figure 4, but showing modifications in construction.

Referring in detail to the drawings, the numeral 25 designates a platform supporting a hollow column 26 having an adjustable arm 27 carrying a tank 28 containing any preferred fluid flux 29.

A flanged reel 30 is mounted revolubly on a bracket 31, adjustable on the column, transverse to its axis, carrying a supply of ribbon like strip material X, trained over a free running guide wheel 32 and under a similar but larger wheel 33, both wheels being mounted on the tank 28, the latter causing the strip to be submerged in the flux, thus covering its entire surface.

The strip X, upon emerging from the bath, is engaged by a wiper device 35, so devised as to remove any surplus flux that may adhere to its sides, such excess returning to the tank by gravity.

Continuing, the strip is trained over a guide wheel 36, carried at the outer end of an adjustable forked support 37, mounted on a housing base 38 fixed on top of the column 26; thence to a progressive series of paired rolls 39, adjustable on the arm 37, by which the strip is crenulated or profiled lengthwise to present alternate ridges and channels, together with edges adapted to interfold throughout its length, all as described in Patent No. 2,305,587, and shown in Figures 8 and 9.

From the rolls 39, the longitudinally undulated strip moves uninterruptedly to a seaming head, generally designated as 40, in which the flexible tube is completely formed and which constitutes the main feature of the invention.

Mounted on an upstanding portion of the housing base 38, see Figure 4, is a plate collar 41, tenoned annularly into the rear side of a thick, substantially circular face plate 42, and clamped thereagainst by studs 43, set in the housing 38, to pass through elongated slots 44 in the face plate and are provided with nuts impinging against its front side.

The face plate has a central bore 45, having fitted to it a bushing 46. On the periphery of the face plate are three flat surfaces 47 equally spaced apart, and leading centrally therefrom, in its rear portion, are radial, undercut recesses 48 extending to the bushing 46 and open at their constricted rear to the collar 41, which serves as their outer wall.

Slidably fitted to the recesses 48, which constitute slide-ways, are the tangs 49 of jaws 50, the tangs having gibs backed by screws in the usual manner. The jaws are each adjustable towards and from the center of the head by screws 51 threaded into the face plate 42, the screws having an annular groove near their heads engaged by a pin 52 which permits rotation but prevents longitudinal movement relative to the jaw.

The forward portions of the jaws extend outwardly beyond the face plate 42 and are bored radially of the head to each receive a sleeve 53, annularly grooved to engage a pin 24 fixed in the jaw, to keep it from moving lengthwise but allow it to turn.

A tangent pin 54 is disposed in each jaw, the pin having a concave recess fitting the sleeve and adapted to firmly clamp it when in adjustment by means of a nut 55 threaded on the extending end of the pin.

Slidable in the sleeve 53 is a spindle 56 having a reduced, screw threaded outer portion 57 to engage a knurled adjusting nut 58 seated on a washer 59 resting on the top of the jaw.

Formed in the lower portion of the sleeve 53 are opposed short lineal slots 60 receptive of a pin 61, set in the spindle 56 in such manner as to avoid relative rotary movement and also limiting longitudinal movement of the spindle.

The inner end of the spindle 56 is reduced in diameter, shouldered, and rigidly fixed in the cross bar portion of a fork 62 by a pin 63. A helical compression spring 23, encircling the spindle, is interposed between the fork, and a plain washer 59' positioned against the under side of the jaw 50.

Both branches of the fork 62 are bored to receive an arbor 64 having a knurled projecting head, and mounted on the arbor is a sleeve 65 backed at its inner end by a washer 66 and at its outer end by a collar 67 provided with a set screw 68, each sleeve having rotatably mounted on it a roller die 69, each of which varies one from another progressively.

From the foregoing it will be apparent that each roller die, carried indirectly by its jaw, may be adjusted relative to the center of the head, independently of the others by operation of the nuts 58; that the angularity of the dies may be adjusted with respect to the mandrel by slackening the pin 54 and turning the sleeve 53; also in the event undue stress occurs between the dies, the springs 23 will permit the forks 62, carrying the dies, to move outwardly.

The face plate 42 is formed with a recess 70 in its front side, as best seen in Figure 2, the lower wall 71 thereof being in a plane coincident with its axis, while the upper wall 72 is raised thereabove at an angle of approximately fifteen degrees.

A bracket 73 is secured on the bottom of the recess, the bracket extending outwardly beyond the periphery of the plate and has revolubly mounted on its outer end a pulley 74 over which is trained a thread of solder Y.

Above this bracket enters the strip X of pliable material preformed by the crenulating rolls in the housing 39.

The entering strip is engaged by a mandrel 75 to become coiled thereon by the rolls 69, the thread of solder Y passing into the joint of the interfolded edges, and eventually the coil is subjected to sufficient heat to cause fusing.

The mandrel 75 which has a slightly decreasing taper from front to rear, enters the head through an axial opening and terminates at its front end slightly beyond the roller dies; the rear portion 76 of the mandrel is made to a standard taper to fit a socket 77 into which it is drawn by the threaded end of a bolt 78, the head of which abuts the outer end of the socket.

The socket 77, at its forward portion, fits within sleeves 79, spaced apart and enclosed within a pulley sleeve 80, rotatable in the support 38, the sleeve having at its outer end a flange 81 abutting the outer end of a bushing 82, and is provided with means for lubrication as shown.

The bushing 82 is set in the hub 83 of a pulley 84, the hub being recessed in its front portion to abut an antifriction thrust bearing 85 which extends partially into the support 38 circumjacent the sleeve 80, which is secured to the support by a set screw 86.

In the web 87 of the pulley is an opening 88 receptive of a pin 89, movable through a lock block 90 fixed on the support 38, and bored to receive the head 91 of the pin, which is normally retained out of engagement with the pulley web by a compression spring 92 coiled therearound.

A handle 93 is fixed in the pin head 91 and the block 90 is provided with a bayonet slot 94 to retain the locking pin when engaged in the pulley web opening 88, as will be understood.

An extension sleeve 95 has a flange 96 attached to the pulley hub 83 by cap screws 97. The outer, rear end of the sleeve has an internal screw thread 98 engaged with corresponding threads 99 on the socket 77 whereby limited longitudinal adjustment of the socket and mandrel 75 may be made in either direction.

Surrounding the sleeve 95, and spaced from its hub 96, is a quill 100 having an internally contracted outer end 101 in threaded engagement with the reduced and shouldered outer end of the socket 77, to which it is secured by a key 102 held by a set screw 103.

The inner end 104 of the quill is enlarged to constitute a bearing for the hub 105 of a webbed hand wheel 106 which may be locked to the quill in the following manner:

The sleeve 95 has a plurality of longitudinal peripheral slots 107 acting as key ways, and the web 108 of the hand wheel 106 has at one point a through opening 109, and its rim contains a passage 110 leading thereto, while in its hub 105 is a screw threaded opening to fixedly receive a sleeve 111.

The sleeve 111 contains a bore to receive the stem 112 of a dog 113 shaped to engage in the slots 107 and is normally pressed therein by a compression spring 114 coiled around the stem.

A transverse slot in the outer end of the sleeve 111 is receptive of tang 115 formed on the hub of a knurled knob 116 held to the stem 112 by a pin 117.

It will now be apparent that upon the several parts being positioned, as shown in Figure 4, the hand wheel 106 is locked to the extension sleeve 95 of the drive pulley so that the pulley and hand wheel move in unison. Therefore, upon turning the hand wheel, rotary motion will be communicated to the socket 77 and the mandrel 75 correspondingly rotated.

If the knob 116 is drawn outwardly, removing the dog 113 from a slot in the sleeve 95, and turned at an angle, obviously no motion is communicated by the hand wheel to the mandrel, normally driven by the pulley 84, which, as shown in Figure 4, is free to rotate, but may be locked against rotation by manipulating the bolt 89 at such times as may be desired, as for instance, in adjusting the rollers 69.

In the modified form of head, shown in Figure 11, most of the parts are duplicated and given the same designating numerals, while others, performing similar functions, are otherwise identified.

Thus the face plate 42 is bored cylindrically and has fitted to it cylindrical rings 118 and 119, enclosed in a bushing 120 in which is set an annular former 121 having forwardly extending step portions 122, through which the mandrel 75 extends to a slight distance therebeyond to the front. The step portions 122 have cam faces so that when the strip is fed to the rolls the step portions 122 exert a cam action to advance the strip to the left as shown in Figure 11.

The fork 62 is provided at its outer front portion with a branch 62" and its rear with a similar branch 62', of lesser length. These branches are bored to receive arbor pins 64 having knurled extending heads and adapted to be held, when properly positioned, by set screws 123.

Mounted on these pins are sleeves 124, having enlarged heads 125 at their outer ends and plain washers 126 at their inner ends, between which is mounted a quill 127 on which the hub 128 of a roll die 129 is revoluble.

The periphery of the roll die is adjusted to a suitable distance from the mandrel 75 and provided midway its length with a bevelled annulus 130, adapted to turn the edge of the strip X as fed forwardly by the mandrel 75 and fixed guide 122.

It is to be noted that while the roll die is perfectly free to rotate, it is prevented from end motion by the elements previously described.

As changes of construction could be made within the scope of the invention, as defined by the appended claims, it is intended that all matter contained in the foregoing description or shown in the accompanying drawings, shall be interpreted as illustrative rather than in a limited sense.

Having thus described our invention and set forth the manner of its construction and application, what is claimed as new and sought to secure by Letters Patent is:

1. In a machine for making flexible metallic tubes from a strip, a fixed die head, a plurality of jaws radially slidable therein, means to adjust said jaws, means to clamp the jaws when adjusted relative to the axis of said head, a fork having a spindle slidable and rotatable in each jaw, means to adjust the spindle longitudinally, means to clamp said spindle in its adjusted rotative position, an arbor removably carried by the branches of said fork, a mandrel, and a form roll die freely rotatable on each arbor to coil the strip on said mandrel.

2. In a machine for making flexible metallic tubes from a strip, a fixed die head, a plurality of jaws radially slidable therein, means to adjust said jaws, means to clamp the jaws when adjusted relative to the axis of said head, a fork having a spindle slidable and rotatable in each jaw, means to adjust the spindle longitudinally, means to clamp said spindle in its adjusted angular position relative to the axis of said head, a compression spring interposed between said fork and jaw, an arbor carried by the branches of said fork, a mandrel rotatably driven on the axis of said head, and formed rolls revolubly mounted on said arbors to coil the strip upon said mandrel.

3. In a machine for making flexible metallic tubes from a preformed strip, a stationary die head, a plurality of radially adjustable die rolls adapted to interfold the edges of the strip carried in said head, a driven mandrel on which said strip is coiled by said rolls, and a stepped ring adjacent said rolls to guide the preformed strip between said rolls, said mandrel being adapted to advance the strip through said head.

4. In a machine for making flexible metallic tubes from a preformed strip, a stationary die head, a plurality of radially and angularly adjustable die rolls adapted to interfold the edges of the strip carried in said head, a mandrel on which said strip is coiled by said rolls, a cammed bushing surrounding the mandrel to guide and advance the preformed strip between said rolls and means to drive the mandrel.

5. In a machine for making flexible metallic tubes from a preformed strip, a stationary die head, a triad of radially adjustable die rolls adapted to interfold the edges of said strip carried in said head, a driven mandrel on which the strip is coiled by said rolls, a stepped cam ring on said mandrel to guide the strip between said rolls and means to adjust said mandrel longitudinally relative to said head, said mandrel being adapted to feed the strip through said head.

6. In a machine for making flexible metallic tubes from a preformed strip, a stationary die head, a triad of equally spaced die rolls carried in said head adapted to interengage the edges of the strip, said rolls being adjustable for tubes of different diameters, and interchangeably mounted in said head, a power driven mandrel on which the strip is coiled interchangeably engaged in its driving means, means to disconnect said power means to permit manual operation, means to guide the strip into engagement with said rolls, and means to adjust said mandrel longitudinally with respect to said head.

7. In a machine for making flexible metallic tubes, a series of paired rolls to longitudinally crenulate a flat strip passed therebetween, a fixed die head having a plurality of roll dies adjustable therein, a mandrel axially rotatable between said dies, cam means to force the strip on said mandrel, disconnectable power means to actuate the mandrel, and manual means to rotate the mandrel upon disconnection of said power means.

8. In a machine for making flexible metallic tubes from a preformed strip, a stationary die head having a plurality of adjustable die rolls to interfold the edges of the strip, a mandrel on which the strip is coiled by said rolls, a cam ring on said mandrel to guide and advance the strip on said mandrel, means to adjust said mandrel linearly, a disconnectable power drive for the mandrel, and a hand wheel for manually operating the mandrel.

HERMAN SHELLMER.
EDWARD J. RENNIE.